Nov. 28, 1950  V. A. RAYBURN  2,531,644
DIFFERENTIAL DRIVE ASSEMBLY FOR
ARTICLE-HANDLING DEVICES
Filed Aug. 14, 1945 2 Sheets-Sheet 1

INVENTOR
V. A. RAYBURN
BY
ATTORNEY

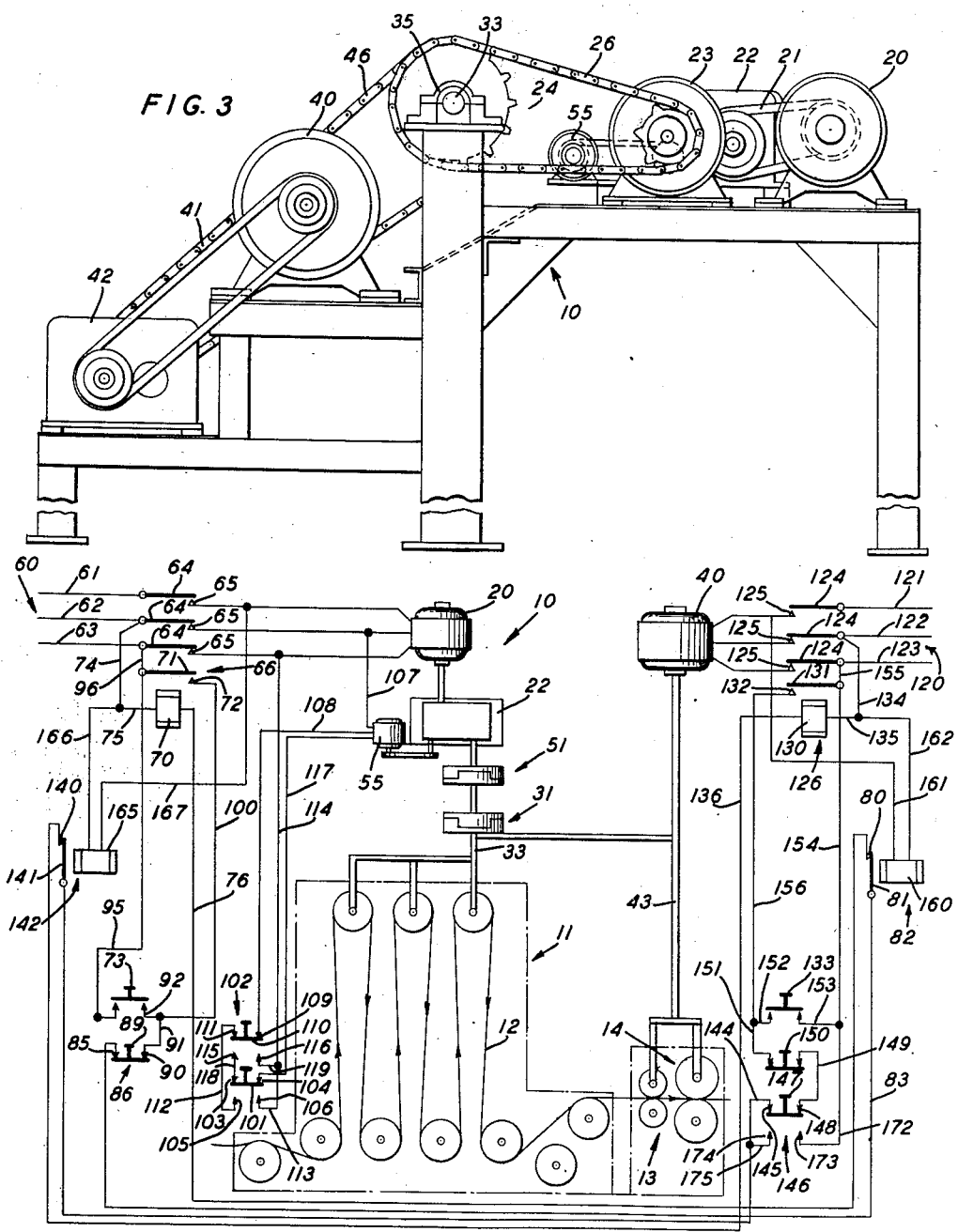

Patented Nov. 28, 1950

2,531,644

UNITED STATES PATENT OFFICE 2,531,644

DIFFERENTIAL DRIVE ASSEMBLY FOR ARTICLE-HANDLING DEVICES

Vincent A. Rayburn, Baltimore, Md., assignor to Western Electric Company, Incorporated, New York, N. Y., a corporation of New York Application August 14, 1945, Serial No. 610,834

2 Claims. (Cl. 271—2.3)

This application relates to differential drive assemblies and more particularly to differential drive assemblies for driving a device at different speeds.

In the preparation of rubber-like materials for the production of articles therefrom, the rubber-like materials are sometimes milled and rolled into strips. Such milling operations heat the rubber-like material, which must be cooled before further operations are conducted thereon. Where a cooler is placed in tandem with a milling device and a drier and a shearer, the cooler must be operated in synchronization with the mill and also in synchronization with the drier and the shearer. The drier and the shearer are sometimes operated at considerably less speed than is the mill so that the cooler must be operated in synchronization with the mill during a portion of the operation of the cooler and in synchronization with the drier and shearer during another portion of its operation.

An object of the invention is to provide new and improved differential drive assemblies.

A further object of the invention is to provide a new and improved drive assembly, which includes a driving shaft for driving one device, a one-way clutch fastened to the drive shaft, an electric motor for rotating the one-way clutch in a predetermined direction so as to rotates the drive shaft in that direction and a second one-way clutch mounted on the drive shaft for driving the drive shaft in said direction. A second drive shaft for driving a second device drives the second one-way clutch when it is rotated and a second electric motor serves to rotate the second drive shaft so that both the first-mentioned drive shaft and the second drive shaft are rotated when the second electric motor is energized, while only the first-mentioned shaft is rotated when the first-mentioned electric motor is energized. Control circuits for the motors are provided so that the first-mentioned motor may be run separately, the second motor may be run separately, and neither motor can be run simultaneously.

A differential drive assembly forming one embodiment of the invention includes means for driving one of a plurality of devices when actuated, means for driving all of the devices when actuated, and means for actuating selectively the first-mentioned driving means and the last-mentioned driving means.

A complete understanding of the invention may be obtained from the following detailed description of a differential drive assembly forming a specific embodiment thereof, when read in conjunction with the appended drawings, in which Fig. 1 is a top plan view of a differential drive assembly constituting one embodiment of the invention;

Fig. 3 is a vertical section of the differential drive assembly taken along line 3—3 of Fig. 1;

Fig. 5 is a diagrammatic view of the differential drive assembly and apparatus driven thereby.

Figure 1:
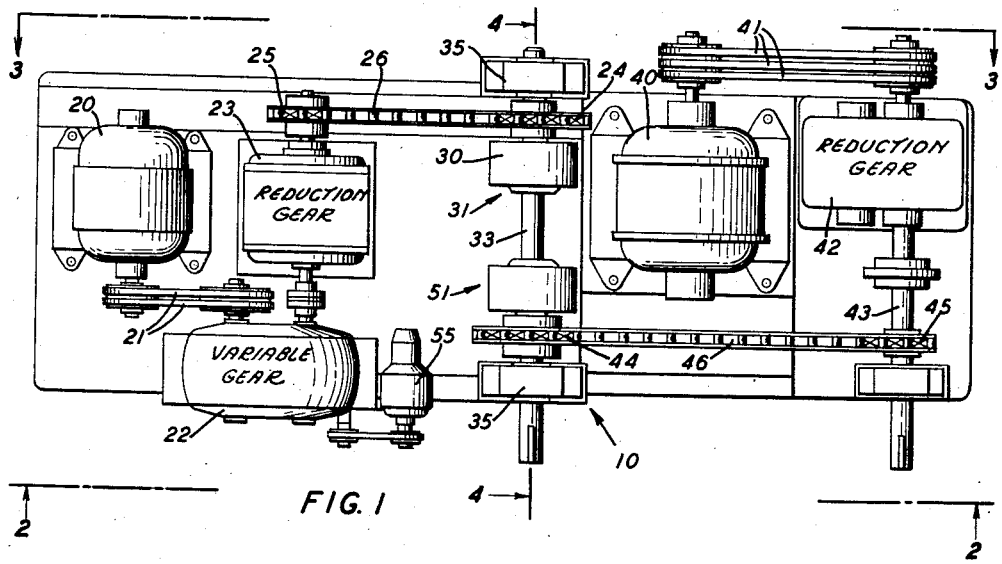
Figure 2:
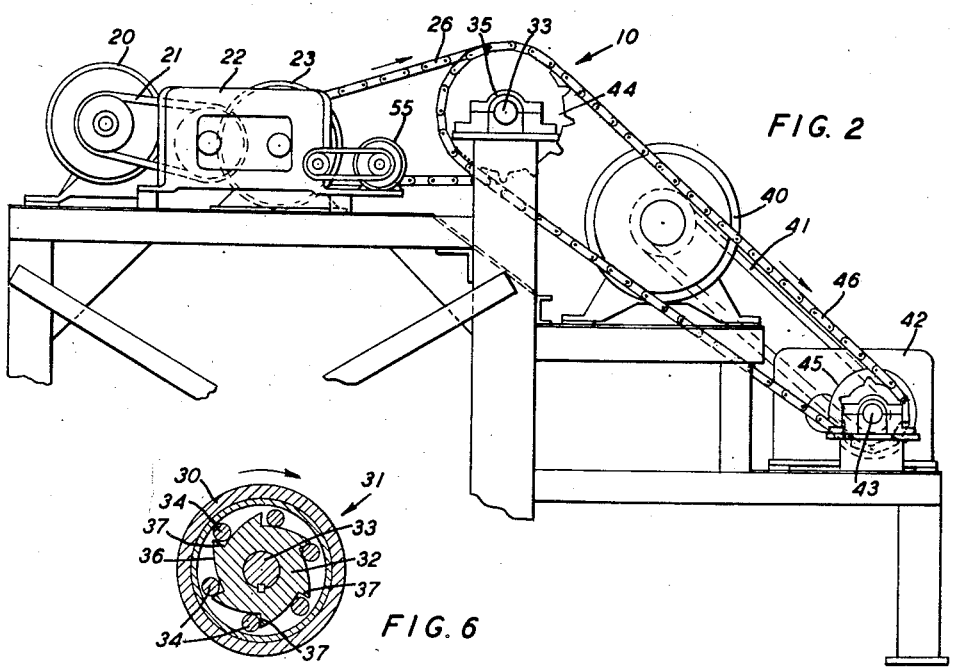
Fig. 2 is a vertical section of the differential drive assembly taken along line 2—2 of Fig. 1.
Figure 6:
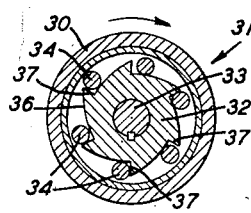
Fig. 6 is a vertical section taken along line 6—6 of Fig. 4.

Referring now in detail to the drawings, there is shown therein a differential drive assembly 10 (Fig. 1) for driving a cooler 11 (Fig. 5) to advance a strip 12 of material from a mill (not shown) to a drier 13 and a shearer 14. The cooler is disclosed in application Serial No. 610,833, filed on Aug. 14, 1945, the drier is disclosed in application Serial No. 610,831, filed on Aug. 14, 1946, now Patent No. 2,501,875, and the shearer is disclosed in applications Serial Nos. 610,832 and 610,835, both filed Aug. 14, 1945, now Patents 2,439,944 and 2,429,945, respectively.

The differential drive assembly 10 (Fig. 1) includes an electric motor 20. When the electric motor 20 is energized, it drives through belts 21—21, a variable gear 22, which in turn drives a reduction gear 23. The gear 23 serves to drive a sprocket 24 by means of a sprocket 25 and a chain 26.

Figure 4:
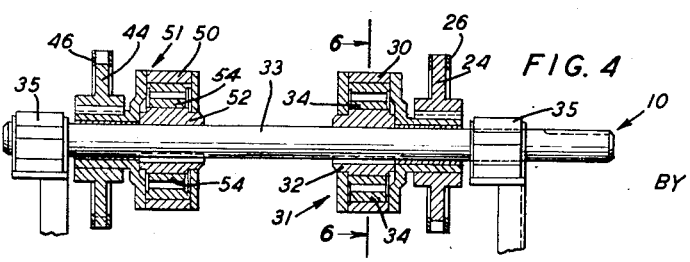
Fig. 4 is an enlarged, fragmentary, vertical section of the differential drive assembly taken along line 4—4 of Fig. 1.

The sprocket 24 is keyed to a driving member 30 (Fig. 4) of a one-way clutch 31, and when the driving member 30 is driven, it drives by means of cam rollers 34—34 a driven member 32 keyed to a drive shaft 33. The one-way clutch 31 is of a well known type and the driven member 32 is provided with wedge portions 36—36 for effecting driving engagement of the rollers 34—34 with the driving member 30. The driven member 32 also has depressions 37—37 formed therein to prevent driving engagement between the rollers 34—34 and the driving member 30 when the driven member is driven by the drive shaft 33 and the driving member 30 is not driven by the motor 20. The drive shaft 33 is rotatably mounted in bearings 35—35 and serves to drive the cooler 11 (Fig. 5) through sprockets and chains (not shown) when it is rotated. When the electric motor 20 is not energized and the sprocket 24 and the driving member 30 of the clutch 31 are stationary, the shaft 33 and the driven member 32 may be rotated in the same direction as that which they are rotated when the driving member 30 is rotated, without moving the driving member 30.

An electric motor 40 (Fig. 1) through belts 41—41 drives a reduction gear 42, which drives a drive shaft 43. The drive shaft 43 drives the drier 13 (Fig. 5) and the shearer 14 through gears (not shown) and also serves to drive a sprocket 44 (Fig. 1) by means of a chain 46 and a sprocket 45 secured to the shaft 43. The sprocket 44 is keyed to a driving member 50 (Fig. 4) of a one-way clutch 51, which includes a driven member 52 and cam rollers 54—54. The driven member 52 of the one-way clutch 51 is keyed to the shaft 33, and when the sprocket 44 is rotated by the motor 40, it serves through the one-way clutch 51 to rotate the shaft 33 in the same direction as that in which the drive shaft 33 is rotated by the motor 20 when the motor 20 rotates the sprocket 24.

The electric motor 20 (Fig. 5) through the variable gear 22 and the one-way clutch 31 serves, when energized, to drive the shaft 33 at a relatively high rate of speed. The shaft 33 is connected to the cooler 11 and serves to drive the cooler at a relatively high rate of speed. An electric motor 55 associated with the variable gear 22, when energized serves to vary the ratio of the input speed with respect to the output speed of the variable gear, and may be used to adjust the speed of the cooler 11 to that of the mill (not shown).

The motor 40 serves to drive the shaft 43, which is connected to the drier 13 and the shearer 14. The shaft 43, when rotated, also serves to rotate the shaft 33 through the one-way clutch 51 but at a slower rate of speed than that at which the shaft 33 is rotated by the motor 20.

A power line 60 including conductors 61, 62 and 63 serves to energize the motor 20 when contactors 64—64 of a holding relay 66 are in engagement with contacts 65—65 thereof. The contactors 64—64 are normally out of engagement with the contacts 65—65 but engagements are made therebetween when a winding 70 of the relay 66 is energized, at which time a holding contactor 71 of the relay 66 is moved into engagement with a holding contact 72 thereof.

The motor 20 may be energized by closing a spring-pressed normally open, momentary starting switch 73. When the starting switch 73 is closed, it energizes the winding 70 of the holding relay 66 through the following circuit: conductors 62, 74 and 75, the winding 70, a conductor 76, a normally closed contact 80 of a block-out relay 82, a contactor 81 thereof, a conductor 83, a contact 85 of a normally closed, stopping switch 86, a contactor 89 of the stopping switch, a contact 90 thereof, conductors 91 and 92 the starting switch 73, and conductors 95, 96 and 63. When the winding 70 is thus energized, the contacts 64—64 are moved into engagement with the contacts 65—65, whereby the motor 20 is energized.

After the winding 70 of the holding relay 66 has been energized by closing the starting switch 73, an engagement between the holding contactor 71 and the holding contact 72 is made and the starting switch 73 then may be released without stopping motor 20. When the starting switch 73 is released, it opens but the winding 70 remains energized through the following circuit: conductors 63 and 96, the contactor 71, the contact 72, a conductor 100, the conductor 91, the stopping switch 86, the conductor 83, the contactor 81, the contact 80, the conductor 76, the winding 70 and the conductors 75, 74 and 62. The motor 20 remains energized until the stopping switch 86 is opened which breaks the circuit to the winding 70 of the holding relay 66 and the engagements between the contactors 64—64 and 71 with the contacts 65—65 and 72, respectively, are broken thereby.

When the contactors 64—64 are in engagement with the contactors 65—65, the motor 55 may be energized to vary the ratio of the input speed with respect to output speed of the variable gear 22 to adjust the speed of the cooler 11 to that of the mill. The motor 55 is energized to increase the output speed of the variable gear by moving a contactor 101 of a switch 102 out of engagement with contacts 103 and 104 thereof and into engagement with contacts 105 and 106 thereof. When the contactor 101 is moved into engagement with the contacts 105 and 106, the motor 55 is energized to increase the output speed of the variable gear through the following circuit: conductors 62 and 107, the winding of the motor 55, a conductor 108, a contact 109 of the switch 102, a contactor 110 thereof normally in engagement with contacts 109 and 111, the contact 111, a conductor 112, the contact 105 of the switch 102, the contactor 101 thereof, the contact 106 thereof and conductors 113, 114 and 63. When the rate of speed of the cooler 11 has been increased to that of the mill, the contactor 101 is moved out of engagement with the contacts 105 and 106 and into engagement with the contacts 103 and 104, whereby the motor 55 is deenergized and the variable gear 22 operates in its adjusted condition.

To decrease the output speed of the variable gear 22, the contactor 110 of the switch 102 is moved into engagement with contacts 115 and 116 thereof. This energizes the motor 55 to drive in a direction to decrease the output speed of the variable gear through the following circuit: the conductors 62 and 107, the winding of motor 55, a conductor 117, the contact 104, the contactor 101, the contact 103, a conductor 118, the contact 115, the contactor 110, the contact 116 and conductors 119, 114 and 63. After the output speed of the variable gear has been lowered to that desired, the contactor 110 is moved out of engagement with the contacts 115 and 116 and back into engagement with the contacts 109 and 111, whereby the motor 55 is deenergized and the variable gear remains in its adjusted condition.

A power line 120 including conductors 121, 122 and 123 serves to supply the motor 40 with electric current when contactors 124—124 of a holding relay 126 are in engagement with the contacts 125—125 thereof. These engagements occur when a winding 130 of the holding relay 126 is energized, at which time a holding contactor 131 of the relay 126 is moved into engagement with a holding contact 132 thereof. To energize the winding 130, a normally open, momentary starting switch 133 is closed, which action completes the circuit through the power line 120 and the winding 130 as follows: conductors 122, 134 and 135, the winding 130, a conductor 136, a normally closed contact 140 of a block-out relay 142, a contactor 141 thereof, conductors 143 and 144, a contact 145 of a jogging switch 146, a spring-pressed contactor 147, which is normally in engagement with contacts 145 and 148, the contact 148, a conductor 149, a normally closed stopping switch 150, conductors 151 and 152, the starting switch 133 and conductors 153, 154, 155 and 123.

Once the winding 130 of the relay 126 has been energized by closing the starting switch 133, the starting switch 133 may then be released without deenergizing the winding 130 of the holding relay 126, the winding 130 then being energized through the following circuit: the conductors 122, 134 and 135, the winding 130, the conductor 136, the contact 140 of the block-out relay 142, the contactor 141, the conductors 143 and 144, the normally closed contact 145 of the jogging switch 146, the normally closed contactor 147, the contact 148, the conductor 149, the normally closed stopping switch 150, conductors 151 and 156, the holding contact 132, the holding contactor 131 and the conductors 155 and 123. Thus, after the starting switch 133 once is closed and even after it is released, the motor 40 remains energized until the stopping switch 150 is opened, which action breaks the circuit to the winding 130, whereby the motor 40 is deenergized.

When the winding 130 of the relay 126 is energized, a winding 160 of the block-out relay 82 is energized through conductors 161 and 162, which are connected to conductors 121 and 134, respectively, the conductor 161 being connected to the conductor 121 on the opposite side of the contactors 124—124 and the contacts 125—125 from that on which the conductor 134 is connected to the conductor 122. Thus, the contactors 124—124 must be in engagement with the contacts 125—125 before the winding 160 can be energized. When the winding 160 is energized, which occurs whenever the motor 40 is energized, the engagement between the contactor 81 and the contact 80 is broken which prevents the energization of the winding 70 of the holding relay 66, whereby the motor 20 cannot be energized. Conversely, when the winding 70 of the holding relay 66 is energized, which occurs when the motor 20 is energized, a winding 165 of the block-out relay 142 is energized through conductors 166 and 167, which are connected to conductors 74 and 61, respectively. The conductors 74 and 167 are connected to their respective conductors 62 and 61 on opposite sides of the contactors 64—64 and contacts 65—65, so that the contactors 64—64 must be in engagement with the contacts 65—65 before the winding 165 can be energized. Thus, when the motor 20 is energized, the winding 165 is energized, and the engagement between the contact 140 and the contactor 141 is broken, whereby the circuit to the winding 130 of the holding relay 126 is opened and the motor 40 cannot be energized.

It it is desired to jog the strip 12, the motor 40 is energized, as long as desired, by holding the contactor 147 of the jogging switch 146 out of engagement with the contacts 145 and 148, with which contacts the contactor 147 is normally in engagement, and into engagement with contacts 173 and 174 of the jogging switch. When the contactor 147 is moved into engagement with the contacts 173 and 174, the motor 40 is energized by means of the holding relay 126, which is energized through the following circuit: conductors 123, 155, 154 and 172, the contact 173, the contactor 147, the contact 174, conductors 175 and 143, the contactor 141 of the block-out relay 142, the contact 140, the conductor 136, the winding 130 of the relay 126 and conductors 135, 134 and 122. At this time, the holding circuit for the winding 130 of the holding relay 126, which circuit ordinarily is closed by the engagement of the contactor 131 with the contact 132, is open because the contactor 147 is out of engagement with the contacts 145 and 148. When the strip 12 has been jogged as far as desired, the contactor 147 is moved out of engagement with the contacts 173 and 174, whereby the winding 70 is deenergized and the motor 40 is stopped.

In the operation of the apparatus described hereinabove, the cooler 11 is started by closing the starting switch 73. The starting switch 73 then is released but the motor 20 continues to run through the holding relay 66 and drives the shaft 33 through the one-way clutch 31 and the shaft 33 drives the cooler 11. When the drive shaft 33 is driven through the one-way clutch 31, the rotation thereof is not impeded by the one-way clutch 51 because at this time the relative movement between the driven clutch member 52 (Fig. 4) and the driving clutch member 50 is opposite to that in which there is a driving connection therebetween.

The strip 12 (Fig. 5) then is guided to the cooler 11 from the mill (not shown), and the cooler conveys the strip therethrough, cooling the strip as it does so. After the cooler is filled with the strip, the stopping switch 86 is opened whereby the motor 20 is deenergized and the cooler is stopped. The strip then is cut at a point between the cooler and the mill.

The contactor 147 of the jogging switch 146 then is moved into engagement with the contacts 173 and 174 and the motor 40 is energized and drives the cooler 11 through the one-way clutch 51, and the drier 13 and the shearer 14 directly. The contactor 147 is held in engagement with the contacts 173 and 174 until the right hand end of the strip 12, as viewed in Fig. 5, is in a position to be inserted into the drier 13. The contactor 147 then is released and moves out of engagement with the contacts 173 and 174 and into engagement with the contacts 145 and 148. When the engagement between the contactor 147 and contacts 173 and 174 is broken, the motor 40 is deenergized and the cooler, the drier and the shearer are stopped.

The starting switch 133 then is closed to start the motor 40, which drives the drive shaft 43, which drives the drier 13 and the shearer 14. The drive shaft 43 also drives the drive shaft 33 through the one-way clutch 51, whereby the cooler 11 is driven. The drive shaft 43 serves to drive the cooler 11, the drier 13 and the shearer 14 in synchronization with each other so that the strip 12 is advanced through the cooler 11 at a slightly lower rate of speed than that at which the strip is advanced through the drier and the shearer.

When the drive shaft 33 is driven through the one-way clutch 51, the rotation of the drive shaft 33 is not impeded by the motor 20 or the gears 22 and 23 because the driven clutch member 32 of the one-way clutch 31 rotates freely without driving connection between it and the driving clutch member 30. After the strip 12 has been run through the cooler 11, the drier 13 and the shearer 14, the stopping switch 150 is opened and the motor 40 is deenergized. The operation described hereinabove then may be repeated in a manner similar to that described hereinabove.

The above-described differential drive assembly serves to drive the cooler 11 in synchronization with the mill and also serves to drive the cooler, the drier 13 and the shearer 14 in synchronization, as desired, and when it is driven in either manner, the means for driving it in the other of these ways is not affected.

What is claimed is:

1. An apparatus for handling filaments, which comprises means for advancing a filament, a second filament-advancing means arranged in tandem with the first filament-advancing means, a shaft for driving the first filament-advancing means to move a filament therethrough toward the second filament-advancing means, a one-way clutch mounted on the shaft for driving the driving means, a source of power for driving the one-way clutch to drive the shaft, a second shaft for driving the second filament-advancing means to advance a filament from the first filament-advancing means, a second source of power for driving the second shaft, a second one-way clutch mounted on the first shaft, means for connecting the second one-way clutch to the second shaft to drive the second one-way clutch by the second shaft, whereby the first filament-advancing means may be driven in synchronization with the second article-advancing means by the second shaft, and means for selectively energizing the first source of power and the second source of power.

2. An apparatus for processing strips of material, which comprises means for advancing a strip of material, a second strip-advancing means arranged in tandem with the first strip-advancing means for further advancing a strip of material advanced by the first strip-advancing means, a shaft for driving the first strip-advancing means to move the strip therethrough toward the second strip-advancing means, a one-way clutch mounted on the shaft for driving the shaft, a source of power for driving the one-way clutch at a predetermined rate of speed such that the first strip-advancing means advances the strip at a predetermined rate of speed, a second shaft for driving the second strip-advancing means to advance the strip from the first strip-advancing means, a second source of power for driving the second shaft at a rate of speed such that the second strip-advancing means advances the strip at a rate of speed substantially lower than that at which it is advanced when said first source of power is operative, a second one-way clutch mounted on the first shaft for driving that shaft, means connecting the second shaft to the second one-way clutch to drive the first strip-advancing means at a rate of speed such that the first strip-advancing means advances the strip at the same rate of speed as the second strip-advancing means, and means for selectively energizing the first source of power and the second source of power.

VINCENT A. RAYBURN.

REFERENCES CITED

The following references are of record in the file of this patent:

UNITED STATES PATENTS

| Number | Name | Date |
|---|---|---|
| 314,207 | Ward | Mar. 17, 1885 |
| 584,577 | Danielson | June 15, 1897 |
| 1,147,417 | Marburg | July 20, 1915 |
| 1,518,592 | McLain | Dec. 9, 1924 |
| 1,906,831 | Baker et al. | May 2, 1933 |
| 2,171,994 | Riise | Sept. 5, 1939 |
| 2,249,873 | Webster | July 22, 1941 |
| 2,296,868 | Pechy | Sept. 29, 1942 |
| 2,356,160 | Horton | Aug. 22, 1944 |
| 2,356,590 | Jacobsen | Aug. 22, 1944 |

FOREIGN PATENTS

| Number | Country | Date |
|---|---|---|
| 29,672 | Great Britain | 1909 |